(No Model.) 2 Sheets—Sheet 1.

N. G. MOONEY.
HORSESHOE PAD.

No. 479,912. Patented Aug. 2, 1892.

WITNESSES:
Charles Schroeder.
Marion Hall

INVENTOR
Nicholas G. Mooney
BY
Gorhee & Raegener
ATTORNEYS.

(No Model.) 2 Sheets—Sheet 2.
N. G. MOONEY.
HORSESHOE PAD.
No. 479,912. Patented Aug. 2, 1892.
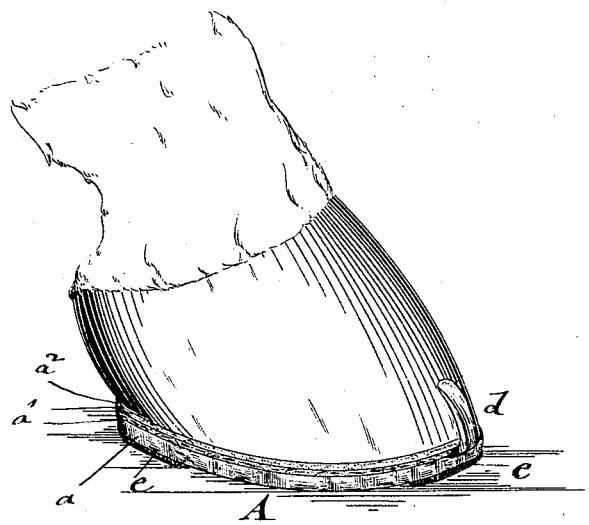
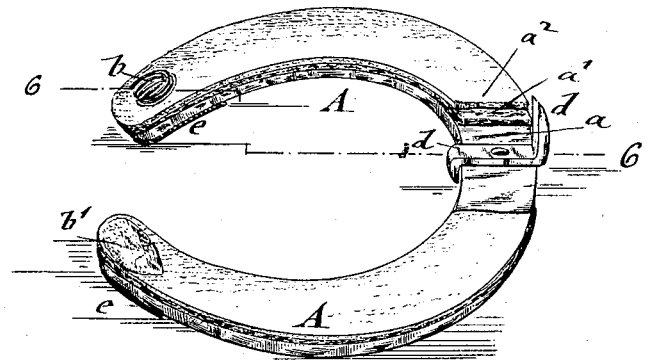
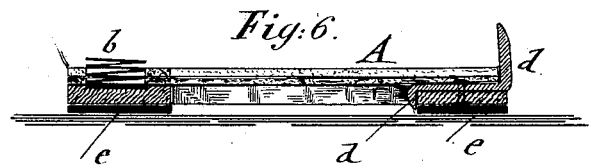
WITNESSES:
Charles Schroeder
Marion Hall
INVENTOR
Nicholas G. Mooney
BY
ATTORNEYS.

UNITED STATES PATENT OFFICE.

NICHOLAS G. MOONEY, OF NEW YORK, N. Y.

HORSESHOE-PAD.

SPECIFICATION forming part of Letters Patent No. 479,912, dated August 2, 1892.

Application filed April 13, 1892. Serial No. 428,978. (No model.)

*To all whom it may concern:*

Be it known that I, NICHOLAS G. MOONEY, a citizen of the United States, residing in the city, county, and State of New York, have invented certain new and useful Improvements in Horseshoe-Pads, of which the following is a specification.

This invention relates to an improved pad that is interposed between the hoof and the shoe in cases in which the hoof is tender or sore, so as to remove the irritation exerted by the contact of the shoe with the foot and exert a healing action on the same; and the invention consists of a pad for a horseshoe composed of several layers that are cut in the shape of the shoe, said layers being interposed between the hoof and shoe and provided at the rear part with socket-holes and cushioning-springs, which latter project above the pad and are covered by a suitable covering-layer.

The invention consists, secondly, of the combination, with a pad composed of several layers, of a retaining device that is attached to the front part of the pad and of elastic plates or calks attached to the front and rear ends of the pad, said pad being applied directly to the hoof and used without the shoe in cases where no heavy work has to be done by the horse.

Figure 1:
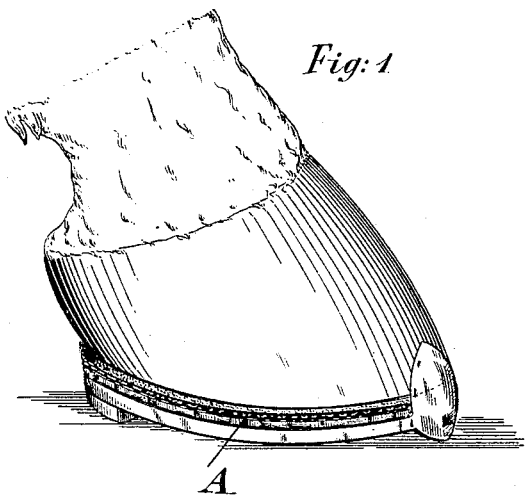
Figure 2:
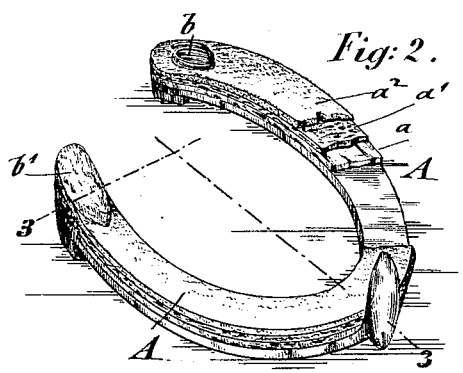
Figure 3:

In the accompanying drawings, Figure 1 represents a perspective view of a horse's foot, shown with my improved pad interposed between the hoof and shoe. Fig. 2 is a perspective view of the pad and shoe as removed from the hoof and with a portion of the pad broken away. Fig. 3 is a vertical section on line 3 3, Fig. 2. Fig. 4 is a perspective view showing my improved pad attached to the hoof and used in place of the shoe. Fig. 5 is a perspective view of the pad, shown with parts broken away; and Fig. 6 is a vertical section on line 6 6, Fig. 5.

Similar letters of reference indicate corresponding parts.

Referring to the drawings, A is a pad, which is made in the general shape of a horseshoe and of a size corresponding to the shape of the hoof with which it is to be used. The pad A is preferably made of three independent layers, a base layer $a$, of sole-leather, an intermediate layer $a'$, of cork, and a top layer $a^2$, of felt or other suitable absorbent material. The base layer of leather imparts strength to the pad. The intermediate layer of cork imparts a certain elasticity to the same, and the top layer serves, by the absorption of moisture, as a cooling medium on a tender hoof; or it may be used as a carrier for a healing-salve, which is applied to the top layer of felt for healing a sore hoof. The three layers $a$, $a'$, and $a^2$ are united by a suitable cement and are made up in different sizes for the different sizes of hoofs, so as to be used as occasion requires, they being put on by the blacksmith at the time when he shoes the feet of the horse. Only the front feet require such pads, as they are usually more tender than the hind feet. The rear ends of the intermediate and top layers of the pad are provided with socket-holes, into which helical cushioning-springs $b$, of suitable steel wire or other suitable material, are inserted, the lower ends of the springs resting on the base layer, while the upper ends of the same project above the pad and are covered by protecting-layers $b'$, of felt, as shown clearly in Figs. 2 and 3. The cushioning-springs $b$ protect the hind part of the hoof to some extent against the injurious influence exerted thereon by the concussions with the ground and relieve somewhat the pressure exerted thereon by the shoe. The cushioning-springs $b$ are set into depressions of the base layer of sole-leather, so that the same, in connection with the holes in the upper layers, form sockets for the springs, so that they are retained in the pad in connection with the covering or protecting layers. As horses having very tender or sore feet cannot be shod at all, it is advisable in such cases to attach my improved pad directly to the hoof in the same manner as the shoe, the front part being retained on the hoof by an upwardly-extending catch $d$, the middle portion or shank of which is riveted to the base layer of the pad, while the downwardly-bent rear portion abuts against the inner edge of the base layer, as shown in Figs. 5 and 6. For pads of this class the base layer of leather is preferably made two or three times as thick as the base layer used in the pads which are interposed between the hoof and shoe, as the entire wear has to be taken up by the bottom layer of leather. In place of calks rubber plates *e* are attached to the under side of the pad at the front and rear ends, which rubber plates are cemented to the bottom of the pad and serve by their elasticity also to neutralize to some extent the concussions of the hoof with the ground. The pad shown in Fig. 4 is also well adapted for riding and other horses which have only light work to do, as a pad of the construction described forms a better and superior protection to the hoof than the ordinary shoe, which is only required when the horse has to perform hard work, as in this case a better hold on the ground is required.

Having thus described my invention, what I claim as new, and desire to secure by Letters Patent, is—

1. A protecting-pad for horses' hoofs, composed of several layers, cushioning-springs arranged in the socket-holes at the rear ends of the pad and projecting above the pad, and covering or protecting layers extending over the cushioning-springs, substantially as set forth.

2. A protecting-pad for horses' hoofs, composed of a base layer of leather, an intermediate layer of cork, and a top layer of felt, said pad being provided with cushioning-springs set into socket-holes at the rear ends of the pad, said springs projecting above the pad, and with covering or protecting layers extending over the springs, substantially as set forth.

3. A protecting-pad for horses' hoofs, composed of a bottom layer of sole-leather, an intermediate layer of cork, and a top layer of absorbent material, cushioning-springs arranged in socket-holes at the rear ends of the pad, covering-layers for said cushioning-springs, a retaining-catch attached to the front part of the pad, and elastic plates or calks attached to the under side of the base layer at the front and rear ends of the pad, substantially as set forth.

In testimony that I claim the foregoing as my invention I have signed my name in presence of two subscribing witnesses.

NICHOLAS G. MOONEY.

Witnesses:
PAUL GOEPEL,
CHARLES SCHROEDER.